J. M. DEMERATH.
NUT BLANCHING MACHINE.
APPLICATION FILED DEC. 19, 1918.
1,350,549.
Patented Aug. 24, 1920.
3 SHEETS—SHEET 1.
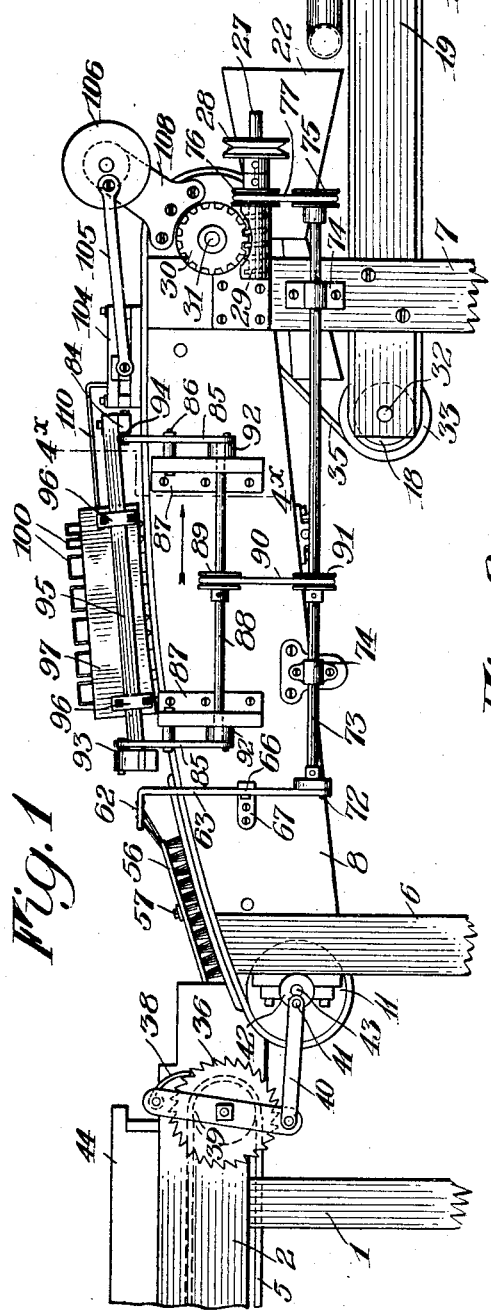
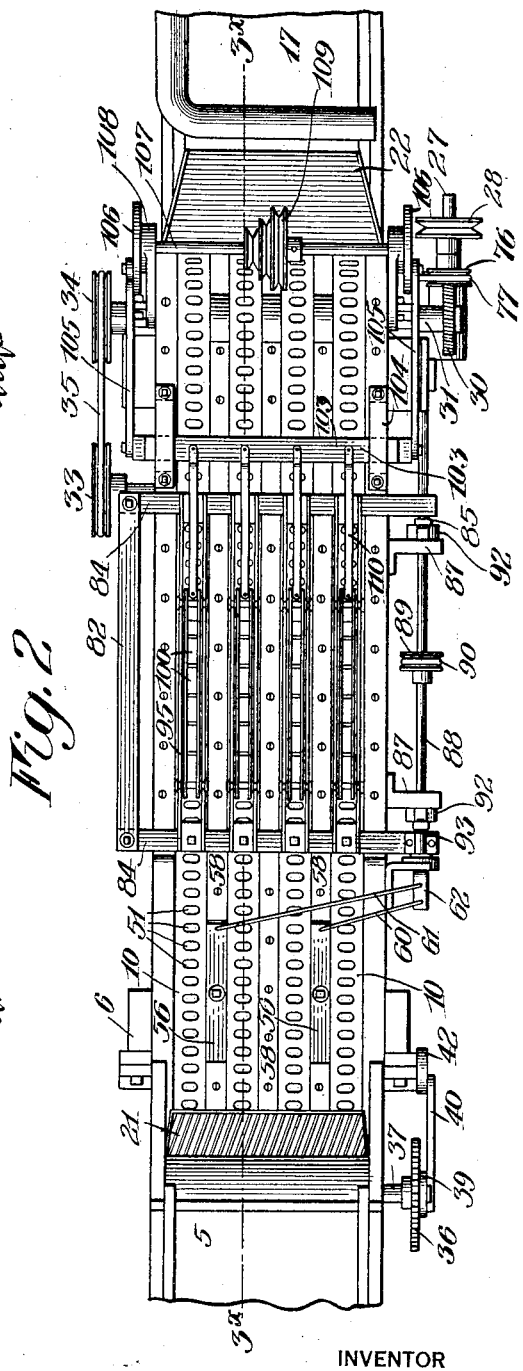
INVENTOR
Joseph M. Demerath
BY
his ATTORNEYS
Witnesses:
Nelson A. Hallauer
Nelson H. Copp J. M. DEMERATH.
NUT BLANCHING MACHINE.
APPLICATION FILED DEC. 19, 1918.
1,350,549.
Patented Aug. 24, 1920.
3 SHEETS—SHEET 2.
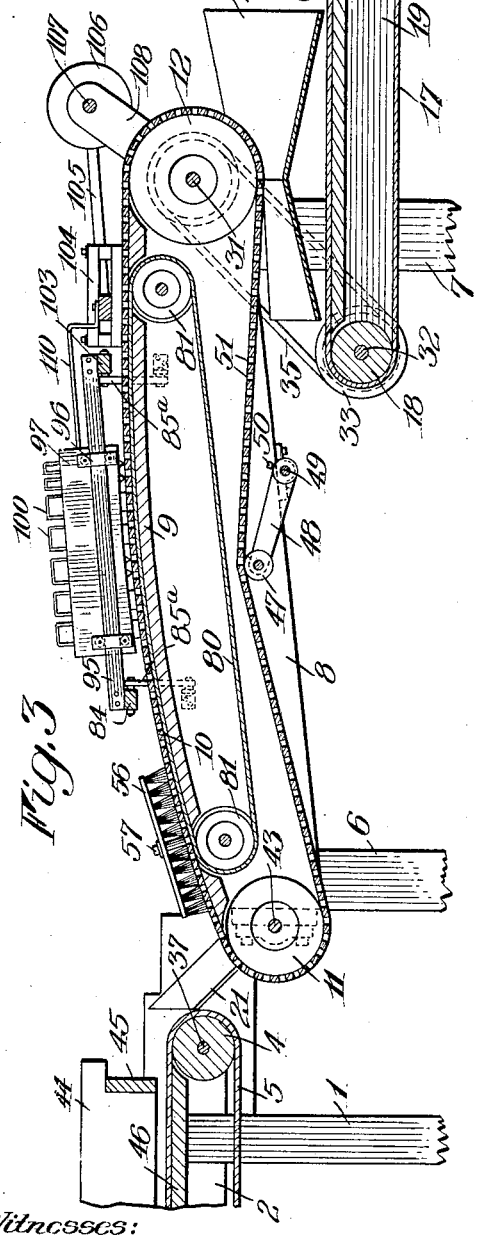
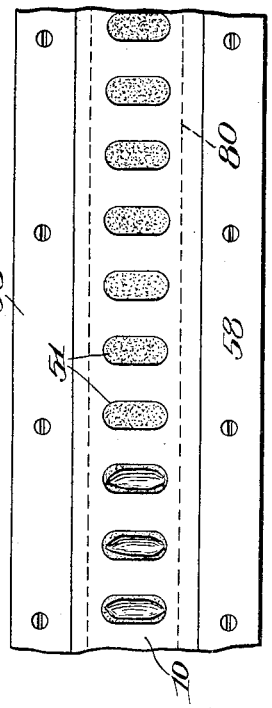
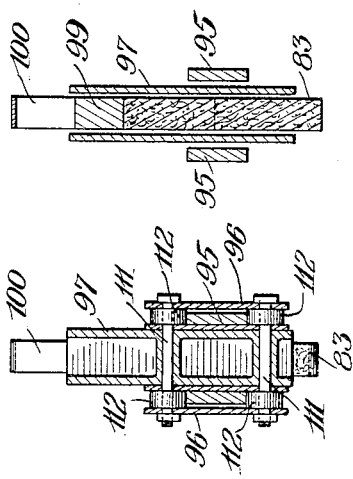
Witnesses:
Nelson A Hallauer
Nelson H. Copp
INVENTOR
Joseph M. Demerath
BY
his ATTORNEYS

J. M. DEMERATH.
NUT BLANCHING MACHINE.
APPLICATION FILED DEC. 19, 1918.

1,350,549.

Patented Aug. 24, 1920.
3 SHEETS—SHEET 3.

Witnesses:
Nelson A. Hallauer
Nelson H. Copp

INVENTOR
Joseph M. Demerath
BY
Church Rich
his ATTORNEYS

UNITED STATES PATENT OFFICE.

JOSEPH M. DEMERATH, OF ROCHESTER, NEW YORK.

NUT-BLANCHING MACHINE.

1,350,549.  Specification of Letters Patent.  Patented Aug. 24, 1920.

Application filed December 19, 1918. Serial No. 267,532.

*To all whom it may concern:*

Be it known that I, JOSEPH M. DEMERATH, of Rochester, in the county of Monroe and State of New York, have invented certain new and useful Improvements in Nut-Blanching Machines; and I do hereby declare the following to be a full, clear, and exact description of the same, reference being had to the accompanying drawings, forming a part of this specification, and to the reference characters marked thereon.

My invention relates to a machine for removing the skins from peanuts and similar articles without splitting or otherwise injuring the nuts and is an improvement on the devices shown in my application for patent Serial No. 175,026, filed June 15, 1917, for machine for skinning peanuts. The object of my invention is to provide improved means for coöperating with the nuts in the endless conveyers for more effectively removing the skins and at the same time reducing the number of broken nuts. More specifically I provide an improved abrading surface over which the nuts are carried in the conveyers, and also improved coöperating means movable both longitudinally and transversely of the conveyers and contacting with the nuts in the conveyers. To these and other ends the invention consists in certain improvements and combinations of parts, all as will be hereinafter more fully described, the novel features being pointed out in the claims at the end of the specification.

In the drawings:

Figure 1 is a side elevation of a machine embodying one form of my invention;

Fig. 2 is a plan view thereof;

Fig. 3 is a longitudinal section on the line 3×—3× of Fig. 2;

Fig. 6 is an enlarged plan view of a portion of one of the conveyers;

Figs. 7 and 8 are sectional views showing the mounting of the frames in which the wipers are carried.

Similar reference characters refer to the same parts in all the figures of the drawings.

Figure 4:
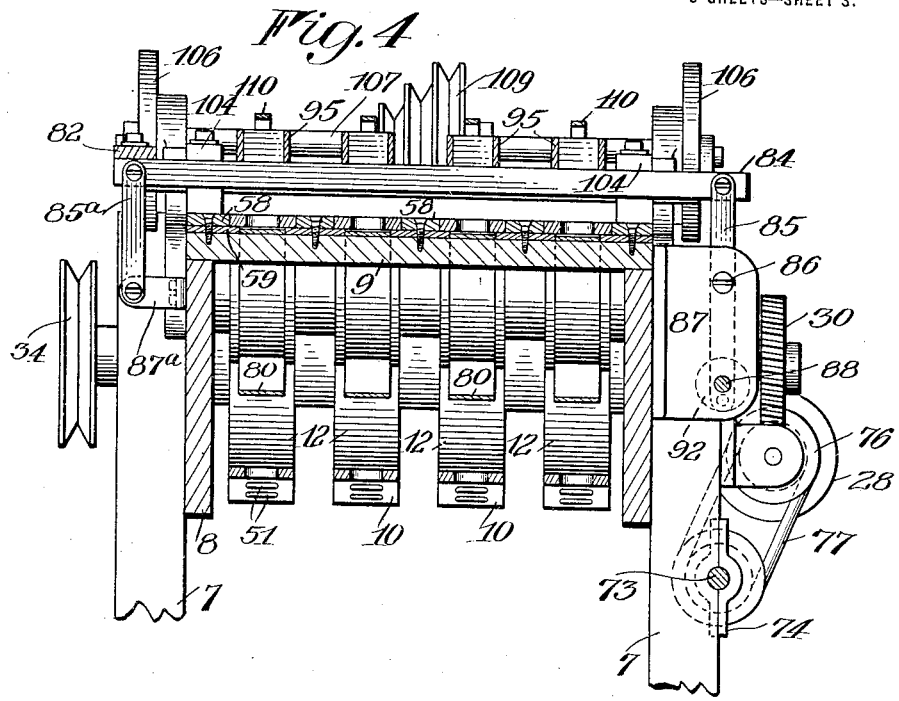
Fig. 4 is an enlarged transverse section on the line 4×—4× of Fig. 1.

In the construction shown in the present embodiment, 1 designates the upright frame members for supporting the side plates 2, upon and between which the roller 4 is journaled carrying the feed belt 5. The frame members 6 and 7 are connected at their upper ends by the inclined side plates 8 which support the table 9 over which the conveyers 10 travel upon the rollers 11 and 12 at opposite ends of the table. At the front of the machine is a delivery belt 17 engaging a roller 18 journaled upon the rear ends of the plates 19 supported on the uprights 7, the belt being arranged to travel over a table 20 spanning the distance between the plates 19.

The feed belt 5 delivers the nuts to a chute 21 from which they descend by gravity to the conveyers 10 by which they are carried to the chute 22 and thence to the delivering belt 17, from which they are discharged.

The driving mechanism for the feeding and delivering belts and conveyer comprises a shaft 27 carrying a pulley 28 which may be operatively connected with any suitable source of power. The shaft 27 is provided with a worm 29 operatively connected with a gear 30 on the shaft 31 upon which the rollers 12 are rigidly mounted. The shaft 32 carrying the roller 18 is provided with a pulley 33 connected with the pulley 34 on the shaft 31 by means of a belt 35, whereby operation of the delivering belt 17 is effected. The feeding belt 5 is operated step by step through the medium of the ratchet wheel 36 rigidly connected with the shaft 37 upon which the roller 4 is mounted, the ratchet being operated by the pawl 38 at the top of the lever 39 which is loosely connected with the shaft 37. The lower end of the lever carries one end of a connecting rod 40 operatively connected with the crank pin 41 on the disk 42 which is rigidly connected with the shaft 43 upon which the roller 11 is mounted. It will be understood, of course, that movement of the lever 39 by the rod 40 when moving in one direction will cause the pawl 38 to ride over the teeth of the ratchet wheel without effecting its operation, while movement of the lever in a reverse direction will serve to effect rotation of the roller 4 to advance the belt 5 upon which the peanuts are carried within the container 44, whereby said belt will periodically deliver the desired quantity of the nuts to the chute 21, depending of course, upon the amount of space between the belt and end member 45 of the container 44. The upper portion of the belt 5 is supported in a horizontal position by the table 46 as shown in Fig. 3.

The conveyers or belts 10 may be properly tensioned by a roller 47 on an arm 48, the position of which may be varied upon the shaft 49, said arm being secured in the desired position by the set screw 50. When the peanuts reach the bottom of the chute 21 they are carried forward in the pockets 51 of the belts, the pockets all being preferably of a size sufficient to hold only one nut at a time.

In some instances, of course, at least two of the nuts may be carried forward by one of the pockets, due to the fact that one nut may push the other along if it is lodged on top of the belt against a nut contained in the pocket. This, of course, is objectionable for the reason that when the nuts pass under the wipers the one on top will be engaged by the wiper while the one in the pocket will not. In order to obviate this difficulty I have provided the oscillatory brushes 56 which are preferably pivoted at their centers upon the bolts 57 projecting upwardly from the belt guides 58 on the strips or cleats 59 secured to the top of the table 9, as shown in Fig. 4. The bottom of the brush is positioned high enough above the belt to clear the nuts in the pockets when moved back and forth above the face of the belt, but not high enough to clear the nuts that may lodge on top of the belt between the pockets, the results being that none of the nuts are allowed to be carried by the belt beneath the wipers other than those lodged in the pockets. This operation is made surer by inclining the table upon which the belts travel so that when the nuts are swept off of the belts by the brushes they will roll back in the direction of the chute 21 to become lodged in the pockets and carried beneath the friction wipers. Each of the brushes in the present instance is adapted to have its ends moved across the face of the two belts between which it is positioned, the arrangement being indicated in Fig. 2. To the inner side of the two brushes at each side of the table are pivotally connected the rods 60 and 61 which are pivoted upon the horizontal arm 62 of the upstanding lever 63. The lever is pivoted at 66 upon the bracket 67 carried by the side rail 8 for supporting the table 9. The lever 63 is extended below the bracket 67 and provided with a slot in which operates a crank pin 72 on the rear end of the lever operating shaft 73. The shaft 73 is rotatably mounted in the bearings 74 and is driven by the shaft 27 through the pulleys 75 and 76 and belt 77, as shown in Fig. 1.

I provide novel means supported on the table 9 beneath the conveyers 10 for abrading and breaking the skins of the nuts in the conveyers. Said means comprises a band or endless belt 80 of sandpaper, emery cloth or the like supported on and in contact with the table 9. The nuts frictionally engage the belt which tends to tear or break the skins. If desired, the band may be supported on the rollers 81 rotatably supported in the frame 8 beneath the table 9 and extend through openings provided therefor in the table 9. By this construction the belt can be moved on the rollers to supply a new portion to the top of the table in operative position, or to expose the portion beneath the conveyers so that it can be readily cleaned with a brush or otherwise.

Novel means are also provided for coöperating with the friction belt for breaking and removing the skins from the nuts. Said means comprises a transversely movable frame carrying a plurality of longitudinally movable wipers 83 adapted to be pressed into contact with the nuts in the conveyers 10. The frame comprises a pair of bars 84 having their ends connected by the bar 82. The frame has a limited transverse reciprocation imparted thereto by a pair of levers 85, pivoted at 86 to brackets 87 secured to the frame member 8. The opposite ends of the bars 84 are supported on links 85ª pivoted to the bars and to brackets 87ª secured to the frame of the machine. A shaft 88 is revolubly supported in the brackets 87 and has a pulley 89 secured thereto. A belt 90 passes over the pulley 89 and a pulley 91 on the driven shaft 73 and transmits motion to the shaft 88 for reciprocating the frame. Secured to each end of the shaft 88 is a disk 92 eccentrically of which is an outwardly projecting pivot pin to which one end of each of the levers 85 is pivoted. The opposite end of each of said levers is pivoted at 93 and 94 to the frame. When the shaft 88 is rotated, the levers 85 are vibrated to reciprocate the frame transversely of the movement of the conveyers.

Figure 5:
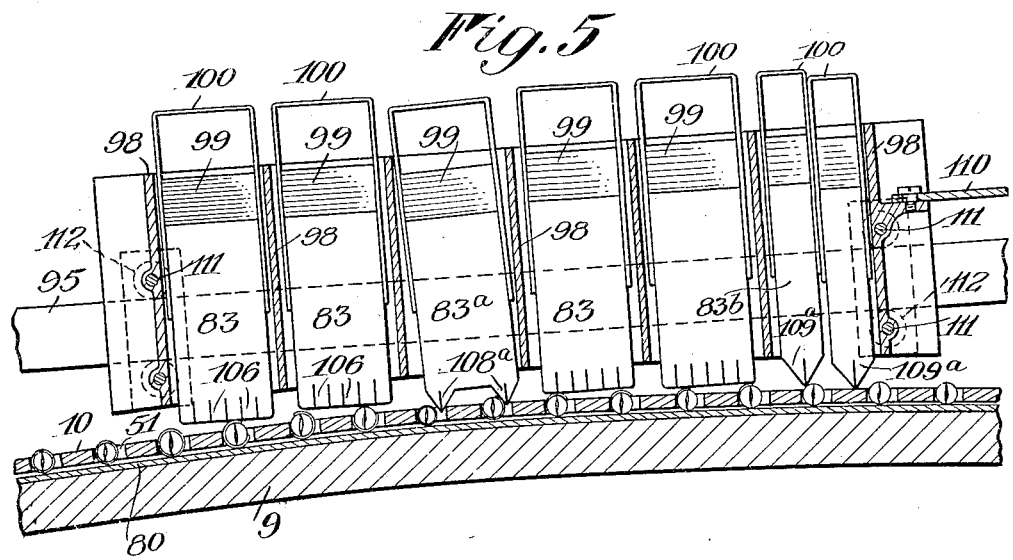
Fig. 5 is an enlarged vertical section through one of the movable frames showing the wipers in elevation.

Rods or bars 95 extend across the frame in pairs immediately over and substantially parallel with each of the conveyers 10. Between each pair of said bars and slidably supported thereon by means of the brackets 96 is a casing 97, each of which is open at the top and bottom and has a plurality of partitions 98 therein which divide the casing into a plurality of substantially rectangular cells. Resting on the conveyer and loosely supported in one or more of the cells is a wiper 83. The wipers are made of suitable resilient elastic material such as soft rubber, and are pressed into contact with the conveyers and the nuts therein by suitable means, such as weights 99. Spring clips 100 fit over the wipers and the weights and furnish suitable means for removing the wipers and their weights from the cells or inserting them therein. The ends of the wipers 83 when they contact with the nuts may be split to provide a plurality of fingers 106 which have a slight spreading action when moved in contact with the nuts. In Fig. 5 of the drawings, I have shown four wipers of this character. Wipers of the form shown at 83ª may also be used, in which a pair of tapering or pointed split fingers 108ª are provided to engage the nuts. These last described wipers may be made of the form indicated at 83ᵇ in which split fingers 109ª are formed on a plurality of independently movable wipers in the same cell. While all the wipers may be of the same form, I have found that best results may be secured by using a combination of the various forms. The wipers 83 first operating on the nuts to break the skins and thereafter the wipers 83ª and 83ᵇ operating on them to remove the broken and loosened skins.

Means are provided for reciprocating each of the housings with wipers longitudinally of the conveyers. Said means comprises a bar or rod 103 extending transversely of the machine and slidably supported thereon at its ends in the brackets 104. Pivoted to each of the ends of the rod 103 is a rod or pitman 105 eccentrically pivoted to a disk 106 secured to the end of a shaft 107 also extending transversely of the machine and rotatably supported in a pair of brackets 108. A cone pulley 109 is also keyed to the shaft 107 by means of which the shaft may be rotated by an endless belt. Each of the housings 97 is operatively connected to the rod 103 by means of a rod or bar 110 pivotally connected to one end of the housing and pivoted to the bar. As the shaft 107 is rotated, the rod 103 and with it the wipers are reciprocated longitudinally of the machine. If desired, anti-friction bearings may be employed as indicated in the drawings on which the housings carrying the wipers are movably supported. For this purpose rods or bolts 111 may be secured in the housings and carry rollers 112 at their ends which engage the rods 95 and movably support the housings thereon.

It will be noted that by the combined movements of the housings and the frame in which they are supported, a curvilinear movement is imparted to the wipers tending to tear the skins from the nuts without crushing the same.

Having described my invention what I desire to secure by Letters Patent is:

1. In a nut blanching machine, the combination of a table, a plurality of slotted conveyers movable over said table, means for feeding nuts to said conveyers, an abrasive sheet supported on said table beneath said conveyers, and means for rolling and pressing nuts in said conveyers into contact with said abrasive sheet.

2. In a nut blanching machine, the combination of a table, a plurality of slotted conveyers movable over said table, means for feeding nuts to said conveyers, an abrasive sheet supported on said table beneath said conveyers, means for rolling and pressing nuts in said conveyer into contact with said abrasive sheet, and movable means on which said sheet is carried for moving it from between the table and conveyers.

3. In a nut blanching machine, the combination of a table, a plurality of slotted conveyers movable over said table, means for feeding nuts to said conveyers, an abrasive sheet supported on said table beneath said conveyers, revoluble means on which said sheet is carried, and means for rolling and pressing nuts in said conveyers into contact with said sheet.

4. In a nut blanching machine, the combination of a table, a plurality of slotted conveyers movable over said table, means for feeding nuts to said conveyers, an endless sheet of abrasive material supported on said table beneath said conveyers, rollers on which said sheet is carried, and means coöperating with nuts in said conveyers for pressing them into contact with said sheet.

5. In a nut blanching machine, the combination of a table or support, a plurality of belts, one within another, movable thereover, means for feeding nuts to one of said belts for abrasion by the other, and a movable wiper coöperating with the nuts on said first mentioned belt for breaking and tearing the skins.

6. In a nut blanching machine, the combination of a table or support, a plurality of belts movable thereover, means for feeding nuts to said belts, and a plurality of wipers movable in a plane substantially parallel with said table and successively engaging the nuts on each belt for breaking and tearing the skins.

7. In a nut blanching machine, the combination of a table or support, a plurality of conveyers movable thereover, means for feeding nuts to said conveyers, a plurality of wipers adapted to coöperate with the nuts in said conveyers, and means for reciprocating said wipers transversely to the movement of the conveyers.

8. In a nut blanching machine, the combination of a table or support, a plurality of conveyers movable thereover, means for feeding nuts to said conveyers, a plurality of wipers adapted to coöperate with the nuts in said conveyers, and means for reciprocating said wipers in the direction of movement of said conveyers.

9. In a nut blanching machine, the combination of a table or support, a plurality of narrow conveyers spaced apart and movable thereover, means for feeding nuts to said conveyers, a plurality of movable wipers, and a plurality of fingers on each wiper adapted to coöperate with the nuts in said conveyer.

10. In a nut blanching machine, the combination of a table or support, a plurality of conveyers movable thereover, means for feeding nuts to said conveyers, a frame supported over said conveyers, a plurality of wipers loosely supported in said frame and adapted to engage nuts in said conveyers, and means for reciprocating said frame transversely of said conveyers.

11. In a nut blanching machine, the combination of a table or support, a plurality of conveyers movable thereover, means for feeding nuts to said conveyers, a frame movably supported over said conveyers; a plurality of wipers loosely supported in said frame and adapted to engage nuts in said conveyers; means for distributing the nuts in said conveyers; a revoluble shaft for actuating said distributing means; and means actuated by said shaft for reciprocating said frame.

12. In a nut blanching machine, the combination of a table or support, a plurality of conveyers movable thereover, means for feeding nuts to said conveyers, a frame movably supported over said conveyers, a plurality of wipers loosely supported in said frame and adapted to engage nuts in said conveyers, means for reciprocating said frame, and means for reciprocating the wipers in said frame.

13. In a nut blanching machine, the combination of a table or support, a plurality of conveyers movable thereover, means for feeding nuts to said conveyers, a frame movably supported over said conveyers, means for reciprocating said frame transversely to the movement of said conveyers, a plurality of frames supported on said frame, and a plurality of wipers loosely supported in said frames and adapted to engage the nuts in said conveyers.

14. In a nut blanching machine, the combination of a table or support, a plurality of conveyers movable thereover, means for feeding nuts to said conveyers, a frame movably supported over said conveyers, means for reciprocating said frame transversely thereof, a pair of bars extending across said frame, a second frame supported on said bars, means for reciprocating said second frame on its supports, and a plurality of wipers loosely supported in said second frame and adapted to engage the nuts in said conveyers.

15. In a nut blanching machine, the combination of a table or support, a plurality of conveyers movable thereover, means for feeding nuts to said conveyers, a frame movably supported over said conveyers, means for reciprocating said frame transversely thereof, a pair of bars corresponding to each conveyer supported on said frame, a frame supported on each of said pairs of bars, and a plurality of wipers loosely supported in each of said frames and adapted to engage nuts in said conveyers.

16. In a nut blanching machine, the combination of a table or support, a plurality of conveyers movable thereover, means for feeding nuts to said conveyers, a frame movably supported over said conveyers, means for reciprocating said frame transversely thereof, a pair of bars corresponding to each conveyer supported on said frame, a frame supported on each of said pairs of bars, means for reciprocating said frames, and a plurality of wipers loosely supported therein and adapted to engage nuts in said conveyers.

17. In a nut skinning machine, the combination of a support, a plurality of conveyers movable thereon, means for feeding nuts to said conveyers, a wiper loosely supported over each of said conveyers, and means for reciprocating said wipers simultaneously in two directions.

18. In a nut skinning machine, the combination of a support, a plurality of conveyers movable thereon, means for feeding nuts to said conveyers, a plurality of wipers loosely supported over each of said conveyers, and means for reciprocating said wipers simultaneously in two directions.

19. In a nut skinning machine, the combination of a support, a plurality of conveyers movable thereon, means for feeding nuts to said conveyers, a wiper loosely supported over each of said conveyers, a plurality of elastic fingers on each of said wipers, means for pressing said fingers into engagement with nuts in said conveyers, and means for moving said wipers.

20. In a nut skinning machine, the combination of a support, a plurality of conveyers movable thereon, means for feeding nuts to said conveyers, a plurality of wipers having elastic fingers loosely supported over each of said conveyers, a wiper having tapered elastic fingers also loosely supported over each of said conveyers, and means for moving said conveyers to carry the nuts under said wipers, the construction being such that the nuts are first engaged by blunt elastic fingers and thereafter by tapered elastic fingers.

21. In a nut skinning machine, the combination of a table, a plurality of recessed conveyers adapted to convey nuts over said table in contact therewith, means for feeding nuts to said conveyers, a sheet of abrading material on said table over which the nuts are fed and a plurality of movable wipers adapted to press and roll the nuts in contact with said abrading sheet.

JOSEPH M. DEMERATH.